Sept. 6, 1938.  E. N. WOOD  2,129,254
RADIATOR APPARATUS AND METHOD
Filed Dec. 23, 1937  2 Sheets-Sheet 1
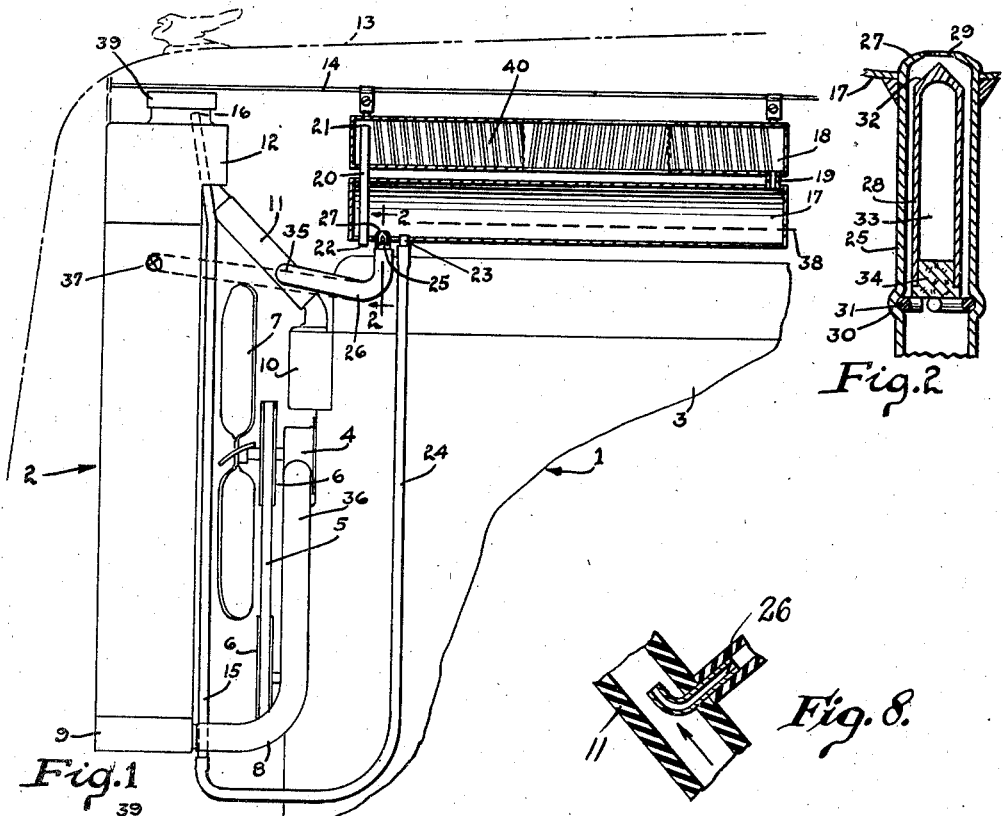
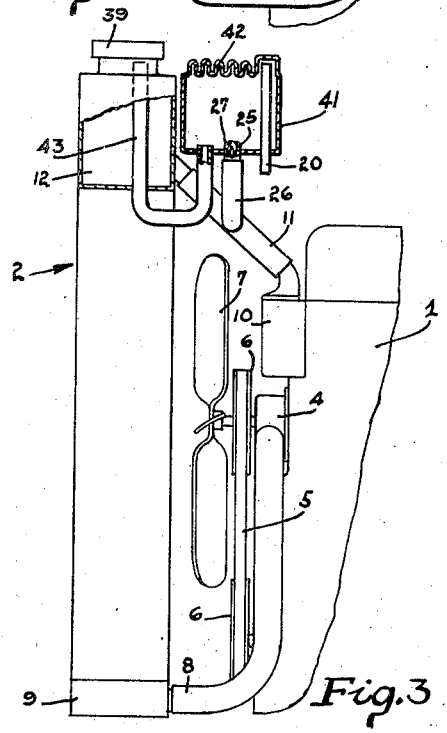
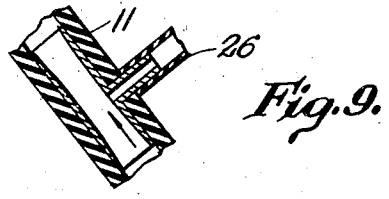
INVENTOR
EVERETT N. WOOD
BY *Paul, Paul & Moore*
ATTORNEYS Sept. 6, 1938. E. N. WOOD 2,129,254
RADIATOR APPARATUS AND METHOD
Filed Dec. 23, 1937 2 Sheets-Sheet 2

INVENTOR
EVERETT N. WOOD
BY
ATTORNEYS

Patented Sept. 6, 1938

2,129,254

UNITED STATES PATENT OFFICE 2,129,254

RADIATOR APPARATUS AND METHOD

Everett N. Wood, Minneapolis, Minn.

Application December 23, 1937, Serial No. 181,345

33 Claims. (Cl. 123—174)

The present invention relates to cooling systems for exothermic engines in which the cooling is accomplished by the circulation of a fluid through the engine and through a heat exchanger. The volume of cooling fluid in such systems is ordinarily maintained constant by the provision of an overflow port through which excess fluid, or vapors, if they should be formed, are permitted to escape to atmosphere.

The cooling fluid of such a system is ordinarily water, during mild weather, but during freezing weather a supplemental anti-freezing constituent such as alcohol, ethylene glycol, or glycerin, is added.

During the operation of a system containing such an anti-freeze cooling fluid, there is frequently an appreciable loss of fluid due to the following causes:

First: Where the anti-freeze constituent is a low boiling point, substances such as methyl or ethyl alcohol, there is a constant evaporation of the anti-freeze due to the fact that the motor temperature frequently exceeds the boiling point of these substances.

Second: Normal expansion with temperature always occurs and causes an amount of fluid from a few ounces to as much as one quart to be ejected through the overflow upon first heating of the liquid in a system which is full when cold. The contraction of the liquid when the system cools brings the level of the liquid in the system to a point well below the overflow port, and inexperienced attendants often mistake this fact to indicate evaporation or leakage from the system, and consequently again fill the system to the overflow level with water or anti-freeze, with consequent added loss when the system is again heated.

Third: Surging accounts for a considerable proportion of the total fluid loss of most internal combustion engines of the automotive type. This phenomenon is due to the formation of vapor bubbles within the system which are trapped within the intricacies of the cooling system network. When such bubbles occur they momentarily force the liquid of the system to a level above the overflow, with consequent loss of cooling fluid. Surging may occur at any time when the system is operating, but occurs to an increased extent (a) when the system is hot, (b) when the cooling fluid includes a low boiling point constituent such as alcohol, and (c) when the circulation of cooling fluid is interrupted or decreased after a fast hot run, as during a momentary pause of a motor car at a traffic signal with the motor idling, or when the motor is stopped abruptly after a load run. Surging occurs in systems in which glycerin or ethylene glycol is used as the anti-freeze constituent, due to the vaporization of the water in the mixture, though to an extent somewhat less than when a low boiling point alcohol is used as the anti-freeze constituent in the same system.

It is an object of the present invention to provide a method of operation whereby the loss of fluid from fluid cooling systems of exothermic engines is overcome, whether this loss is due to evaporation, normal expansion with heat, or surging.

It is also an object to provide a unitary construction which may be utilized with internal combustion engine systems already in operation, which will overcome the loss of cooling fluid, whether it be due to evaporation, expansion, or surging.

It is also an object of the invention to provide a unitary structure with a minimum number of moving parts which will accomplish the function of returning to the cooling system, the cooling fluid passed through the overflow port due to expansion, evaporation or surging, and it is an additional object to accomplish this function without the introduction of air into the cooling system.

It is also an object of the present invention to provide a sealed cooling system for an exothermic engine in which there is normally no breathing of the system to atmosphere.

It is also an object of the invention to provide a safety device in a sealed engine system whereby the development of excessive pressures under unusual operations will be obviated.

It is also an object of the invention to provide an engine control device for a sealed engine system, by which to obviate the development of excessive pressures in the system.

The invention is illustrated in the accompanying drawings in which the same numerals indicate corresponding parts in all views.

Figure 1 is a view partly in section of the present invention as applied to an internal combustion engine and cooling system of the automotive type.

Figure 2 is a detail in section along lines 2—2 of Figure 1 of a valve used in conjunction with the system shown in Figure 1.

Figure 3 is a modification of the invention showing the radiator apparatus of the present invention applied to a radiator system of a particular design.

Figure 8 is an enlarged detail in section showing a modified type of connection between the engine and one line of the unit shown in Figures 1, 3 or 4.

Figure 9 is an enlarged detail in section showing another modified type of connection.

Figure 5:
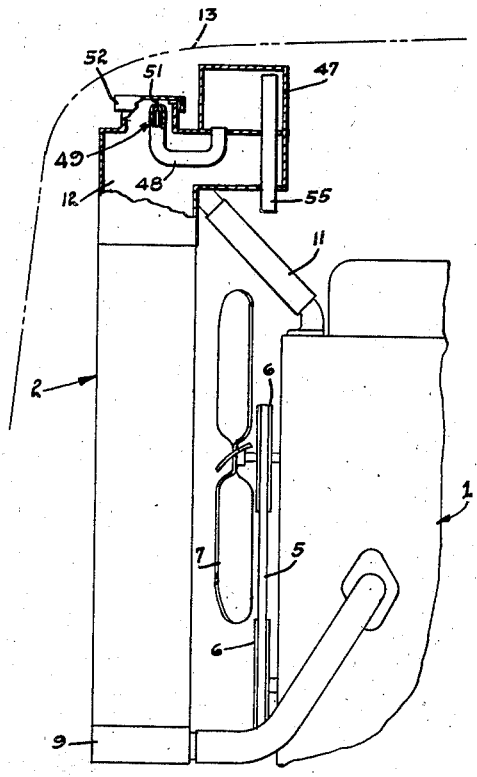
Figure 5 is a modification of the present invention which is integrally combined with the radiator apparatus of an internal combustion engine.

In Figure 1 the radiator apparatus of the present invention is shown applied to an automotive engine and cooling system having an engine generally designated as 1, and a radiator generally designated as 2. The engine consists of a motor block 3 which is provided with a labyrinth of passages (not shown) through which cooling fluid is circulated by means of pump 4. The pump is driven from the crank shaft by a belt 5 and pulleys 6 according to the usual practice. The pump shaft also carries fan 7. Tubular connection 8, which connects the bottom header 9 of radiator 2 and the intake of pump 4, serves as a cooling fluid inlet to the motor block. The cooling fluid outlet from the motor block is tubular connection 11 which joins the cylinder head 10 and the upper header 12 of the radiator. The upper and lower headers of the radiator are connected by a plurality of heat dissipating sections which are not illustrated in detail since they are made according to the usual practice. The entire mechanism of the motor is housed under a radiator and hood structure 13 which in usual systems includes a brace rod 14. The radiator 2 is provided with the usual overflow tube 15 which extends downwardly from overflow level 16. The overflow tube establishes the level of fluid within the cooling system.

Method of the present invention may be carried out by a number of apparatus of which those to be described are representative. The first type of apparatus is one that is adapted to be installed in existing automotive engine radiator systems and comprises a surge tank 17, and a condenser section 18 which may, if desired, be constructed according to my Patent Number 2,074,350, issued March 23, 1937. The condenser section 18 is joined to one end of the surge tank 17 by nipple 19 which serves as the communicating passageway between the two. At the opposite end, the condenser and surge tank are fastened together by a tube 20 which is the overflow from condenser section 18. It will be noted that overflow tube 20 communicates with the condenser section at point 21 but passes straight through the surge tank 17 to atmosphere at point 22.

The surge tank 17 has two connections to the cooling system, the first being by way of short nipple 23 which is joined to overflow pipe 15 by a loop of rubber tubing 24. This tubing serves as a communicating passage between the overflow pipe 15 of the normal radiator system and surge tank 17. In some installations it is desirable to restrict the entrance of nipple 23 where it enters tank 17, for a purpose which is explained hereinafter. It should be noted that nipple 23 enters tank 17 at the bottom of the tank. This is important for a reason which will be explained.

It will be noted that the overflow tube 15 and the rubber tube 24 constitute a U-tube which traps fluid and serves to seal off the cooling system from atmosphere. This is an important feature of the connection, as will be explained subsequently.

The second connection between the surge tank and the cooling system is by way of tube 25, the diameter of which is somewhat exaggerated in Figure 1. This connection is joined to the upper hose connection 11 of the normal cooling system by means of a length 26 of rubber tubing.

The tube 25 constitutes a valve chamber and is shown enlarged in Figure 2 of the drawings. The chamber 25 consists of an elongated body having an inwardly turned bead 27 at the upper end which forms a valve seat for the float-check element 28. The bead 27 is of such shape as to allow a free passageway 29 to the interior of the surge tank 17. The lower end of connection 25 is formed with an annular bead 30 which receives a snap-ring 31 which prevents the float-check member 28 from dropping out of connection 25 when the connection is empty. The float-check element 28 is preferably moulded from a phenol-formaldehyde condensation product, or from a similar non-corrosive material, and is formed with a conical upper portion 32 and a hollow interior 33 which is stoppered at its lower end by cork 34. The weight of float-check element 28 is such that it will float in the cooling fluid of the system and will accordingly float upwardly until it rests against the interior surface of valve seat 27 when fluid rises in connection 25, thus closing the opening 29 against the flow of liquid upwardly through the connection. However, when the fluid of the system recedes in connection 25 the float-check element 28 will drop until it rests upon snap-ring 31, thus permitting fluid to flow downwardly through the connection 25 from tank 17 to the cooling system.

The tubular connection 26 is, for convenience, joined to upper hose connection 11 at point 35 but it is to be understood that this is merely illustrative of various locations at which the tube 26 can be connected. The selected point of connection 35 may be any point in the cooling system at which the following conditions prevail: (1) The average pressure of the fluid in the system at the selected point 35 must be positive during normal operation of the system. (2) The pressure at the point 35 must at intervals during the operation of the system be less than the pressure exerted at the point when the system is not operating. With these criteria in mind the connecting point 35 may be made at various places in the system, for instance, directly to the radiator as at the point 37, the location being immaterial so long as the above criteria are fulfilled.

The operation of the present invention is based upon the discovery that in cooling systems of engines of the type here described, whether of the forced circulation or thermosiphon type, that if the normal overflow is sealed as by a fluid trap, or otherwise sealed against ready passage of air or fluid, pressure of the cooling fluid at selected points in the system, will conform to the above mentioned conditions, that is to say, when the system is operating the average pressure at the selected point will decrease below the pressure at the corresponding point when the system is not in operation, and will then oscillate above and below this decreased average as the system continues in operation. Thus, if the overflow is provided with a fluid trap, and a manometer is attached at, for example the point 35 (as in Figure 1), when the system is cold and not in operation, the fluid level of the manometer will be level with that in the system, but that when the system is placed in operation the fluid level of the manometer decreases to an average position which is considerably below the level when the system is cold, thus indicating a decreased average pressure at the selected point. In some instances a decrease of as much as six inches of water average has been noted where the selected point was the upper hose connection, while in other instances the decrease was as little as one inch of water, average. If desired the connection of tube 26 to hose 11 at point 35 may be by way of a suction type pitot tube, as shown in Figure 8, or a Venturi restriction may be placed in tube 11 and the connection 35 made at the restriction so as to induce a further suction due to the velocity of flow in tube 11, as shown in Figure 9.

The pressure reading is not constant during the operation of the system but oscillates above and below an average value which is less than the pressure at the selected point when the system is cold and not in operation. It is believed that these oscillations in pressure may be due to the formation of small vapor bubbles in the system which momentarily surge and raise the pressure of the system, and then collapse and cause the liquid to recede, and thus causes the oscillations in the pressure at the selected point.

It is to be noted in passing that in some systems, for example the forced circulation type, a negative pressure may be developed in some parts of the system under normal operation. This might occur at, for instance, the intake 36 of pump 4 of the system shown in Figure 1. If the tube 26 were connected to the intake side of pump 4, air would be drawn into the system and deleterious results would ensue. Hence in the present invention a point of connection, such as point 35, is selected at which the normal average pressure is positive. Even at such selected points the oscillation in pressure may carry the instantaneous pressure into the negative range, but a point is selected at which the average pressure is positive so that deleterious aeration is obviated even without the use of especial valves to prevent aeration.

In the operation of the system shown in Figure 1 the cooling system is filled with cooling fluid until it reaches the level 16 of overflow pipe 15 when cold. No excess of fluid is permitted to collect in tubes 15 and 24, otherwise surge tank 17 would be filled, and prevented from serving its function as presently explained.

When the system is started and the cooling fluid heated in operation, normal expansion occurs and forces a part of the fluid over the overflow 16 and through tubes 15 and 24 into the surge tank 17. The flow fills tubes 15 and 24 which thus trap and seal-off the radiator from atmosphere. In tank 17 the flow establishes a fluid level, as at 38, which for convenience is called the hot level. At the same time as the system begins to operate the average pressure at point 35 decreased below the pressure previously maintained at that point when the system was cold. However, this average pressure remains positive and therefore tube 26 remains full of fluid, with the result that float-check element 28 is lifted against valve seat 27, thus closing orifice 29 into the surge tank. As previously explained, small surges occur during normal operation of the motor, and at each surge there is an oscillation of pressure above and then below the average (decreased) pressure at point 35. The decrease below the average pressure draws float-check element 28 downward and pulls a slight amount of fluid into line 26 from tank 17 which is then standing at the hot level 38. It is noted that the height of the surge tank 17 with respect to the system is such that when the small surges occur and collapse, the slight decrease in pressure is sufficient to pull fluid into the system. It is also probable that the relatively greater inertia of fluid in lines 15 and 24, as compared with that of the fluid in line 26, serves to enhance the flow through the latter.

The system remains in this condition without material change until a large surge occurs as when the motor is stopped after a hard load run or idled momentarily during traffic. When such an operating condition occurs the motor block 3 which is at high temperature, receives an insufficient amount of cooling fluid due to the slow operation of pump 4, and the fluid in the labyrinths within the motor block 3 is accordingly heated until it reaches boiling temperature, at which time it forms a vapor bubble which may be of large volume, as for instance, several quarts volume.

The occurrence of this large surge vapor bubble forces the cooling fluid from the block through lower connection 8 and upper connection 11 into the radiator 2 and thence through overflow pipe 15 and tube connection 24 into surge tank 17. The occurrence of such a surge in the usual automotive system would cause a large and serious loss of fluid through the overflow.

As previously explained, nipple 23 may be formed as a restricting orifice so as to cause the development of some pressure due to the surge. The size of the orifice depends upon the strength of the system and the permissible pressure that may be developed in it, it being desirable to make the pressure as high as possible so as to expend a maximum amount of energy of the surge in tank 17.

As the surge occurs the level of the fluid in tank 17 rises from the hot level 38 until the pressure of the surge is expended. In some instances the surge may be of size sufficient to force the cooling fluid into the condenser section 18, and if of sufficient force, through the condenser to atmosphere through overflow pipe 20. However, the size of the surge tank 17 is proportioned so as to accommodate all normal surges that may occur, and it is only when the system is abused, as by completely covering the radiator, that excessive surging sufficient to pass through the condenser 18 to atmosphere, would occur. The oppositely disposed corrugated sides of condenser section 18 interpose considerable resistance to the flow of fluid through the condenser from nipple 18 to overflow 20.

During the surge, none of the fluid of the cooling system is forced into the tank 17 through tube 26 due to the fact that float-check element 28 is seated tightly against valve seat 27. All of the fluid expelled from the cooling system, therefore, traverses the overflow pipe 15 and tubular connection 24.

As the surge collapses due to the cooling of the vapor bubble which caused the surge, a powerful suction is generated which tends to draw fluid from surge tank 17 back into the cooling system. This withdrawal of fluid from tank 17 is facilitated in the present invention by the fact that float-check valve 25—28 permits fluid to pass from the tank 17 to the system, and a large quantity of fluid therefore passes from the tank 17 directly into the cooling system, by way of connection 26. A certain amount of fluid is, of course, drawn into the system by way of tube 24 and overflow pipe 15 thereof, but the hydraulic lift occasioned by the length of tube 15 is such that a major proportion of the fluid enters the system by way of tube 26.

The collapse of the surge normally returns the level of the fluid in tank 17 to the normal hot level 38, but this depends somewhat upon the tightness of a connection at the radiator filler cap 39 and other parts of the system. Any air leakage which may occur at 39 has a cumulative effect in that for each successful surge a slight amount of liquid will be left in tank 17 which was not there previously, with the result that the level of tank 17 would gradually build up except for the phenomena now to be described.

During the operation of the engine, as previously explained, the average pressure at selected point 35 drops below the pressure at the point when the system is cold, and the instantaneous pressure oscillates above and below the average value. At each oscillation the float-check valve 28 will drop and draw a small amount of fluid into the connection 26. As the instantaneous pressure rises about the average value the float-check element 28 lifts and seats against valve seat 27 but the fluid previously drawn in is retained. Thus, with successive oscillations about the average lowered pressure small amounts of fluid are drawn into the system from surge tank 17 until the fluid level is brought down to a point balancing the lowest instantaneous pressure at point 35. The cooling fluid is thereby prevented from accumulating in surge tank 17.

Any evaporation that occurs in the system forces the vapor down overflow pipe 15 and through the liquid that is standing in that pipe and in surge tank 17, and into the space above the liquid in surge tank 17, and thence into condenser section 18. Since the liquid in tube 24 and in surge tank 17 are usually at a temperature substantially below the temperature of the cooling system, a considerable condensation of vapors occurs due to the passage of vapors through the liquid, but if such condensation effect should not be sufficient, the vapors pass into condenser section 18 where an extended heat transfer surface 40 serves to reduce the vapors to a fluid condensate which is then returned to the system by way of nipple 19.

Aeration of cooling fluid in the present system does not occur to any deleterious degree because the pressure at selected point 35 is normally positive and because there is usually a minimum of fluid in tank 17 due to the normal expansion with heating. Thus, if the instantaneous pressure at point 35 should become negative there is liquid to satisfy the flow into the system, and this liquid is usually sufficient to more than fill the system when hot. The negative pressure simply sucks in liquid until the void which caused the negative pressure, is filled. It is therefore unnecessary to provide any valve mechanism or device to prevent the passage of air into the system.

Under certain abnormal conditions of operation there is the possibility that the system may take in a small quantity of air as now to be explained, but this quantity is limited in amount and is insufficient to be harmful. In the event the normal fluid level of the system when cold is permitted to fall below the overflow level 16 a smaller amount of fluid, or in extreme cases, no fluid at all, will be passed to the surge tank 17 upon normal expansion with heat. When even a small amount of fluid is expelled no aeration occurs, and it is not until there is such a deficiency that no fluid is passed over due to the expansion with heat, that the possibility of taking air exists. When such is the case, when a surge occurs, first the air above the liquid in radiator header 12, and then some fluid is expelled into tank 17. The entire quantity of fluid in the tank is due to the surge, and when the surge collapses, all of the liquid within the tank 17 will be drawn back into the cooling system. However, this will not serve to satisfy the surge collapse and as much air will be drawn into the system as was initially expelled. However, due to the fact that both the tube 26 and the tube 24 communicate with the bottom of surge tank 17, when the surge collapses and creates a suction in the system it will first be satisfied with fluid in the tank 17 until all of the fluid of the tank is drawn off, after which a small quantity of air which had originally been above the liquid in the radiator header 12, may be drawn into the system. The result is that whether the surge expels only liquid from the system as it does when the system is full, or whether it first drives out the air in the radiator header 12, and then liquid, the collapse of the surge always first withdraws the liquid from tank 17.

It is to be noted that this condition by which a small quantity of air is taken into the system occurs only under the condition where the normal expansion with heat fails to bring the fluid level up to the overflow point 16. Thus, the system may run from a few ounces to as much as a quart empty (depending upon the volume of the system and other factors) without danger of even this slight aeration. It is also to be noted that the amount of air taken is equal to the fluid deficiency of the system minus the volume of the expansion of the system with heating. It is further to be noted that under this abnormal condition the air which is taken into the system is, in Figure 1, at the upper hose connection 11, and the air is therefore not trapped in any portion of the system but harmlessly accumulates above the cooling fluid in header 12 and represents a deficiency in fluid in the system.

In the modification shown in Figure 3 the surge tank and condenser section are combined in one unitary tank 41 which has an upper corrugated heat dissipating surface 42 which serves to condense vapors emitted from the cooling system. In this modification it is to be noted that the normal overflow pipe of the system has been replaced by a short bent tube 43 which acts as an overflow for the radiator 2 and communicates directly with the lower portion of the tank 41. Tank 41 also has a connection 26, which is in all respects the same as that shown in Figure 1, and an overflow tube 20 which vents the system to atmosphere. The operation of the device shown in Figure 3 is substantially the same as that shown in Figure 1 except that when a surge collapses a greater proportion of fluid will be drawn back into the system by tube 43 due to the fact that it does not have a long vertical trap section such as is present in Figure 1, due to the manner of connecting tubes 15 and 24.

Figure 4:
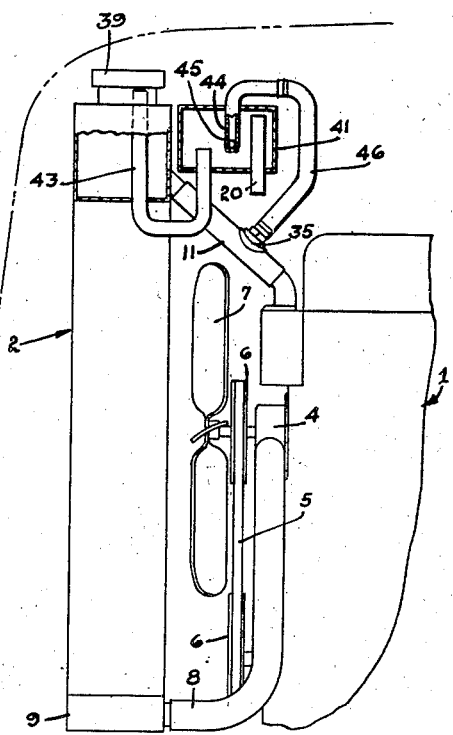
Figure 4 is a modification of the invention particularly adapted for use in systems having a high boiling point anti-freeze constituent.

In the modification shown in Figure 4 the tubular connection to the selected point 35 of the system is by way of a siphon tube 44—46. This modification may, if desired, be provided with a ball check valve 45 at the entrance to leg 44 of the siphon tube. This valve prevents the influx of liquid into the tank 41 when the system surges and the fluid in the system expands due to increases in temperature. In this system when the surge collapses it will draw liquid into leg 44 of the siphon and then downwardly through portion 46 into the upper hose connection 11 of the cooling system. The flow will then continue under the influence of the vacuum created by the collapse of the surge, and thereafter due to a siphon action until the system is full.

In this modification, as in those previously described with the trap in the overflow line from the main radiator system, the pressure at selected point 35 is less during the operation of the system than when the system is idle, but the average pressure at this point is positive. This fact, as previously explained, prevents the aeration of the system by way of tube 44—46.

In the modification shown in Figure 5 the surge tank consists of an elevated receptacle 47 which is connected to the section 12 of radiator 2 by means of a short U-tube 48. It will be noted that U-tube 48 communicates with the bottom of chamber 47 and at its other extremity serves as an overflow in the radiator section 12. A valve structure generally designated 49, shown in detail in Figure 6 is provided at the overflow end of tube 48.

Figure 6:
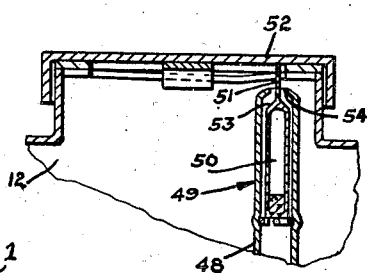
Figure 6 is an enlarged detailed section of a portion of Figure 5.

Valve 49 of Figure 6 is similar to the float-check valve shown in detail in Figure 2, except that the float element 50 at its upper extremity is provided with a tipped portion 51 which is of sufficient length to contact with the under side of radiator cap 52 when the latter is in place. When this occurs the float-check element 50 is forced downwardly so as to hold the conical valve surface 53 away from valve seat 54, thus keeping the U-tube 48 open for flow in either direction.

When the liquid in the cooling system expands due to change in temperature, or when it is forced out as during a surge, the fluid of the system will flow through U-tube 48 around valve 49 which is then held in its open position, and into surge chamber 47, which is vented to atmosphere by means of overflow pipe 55. When the surge collapses or when the liquid contracts due to cooling the liquid level in surge chamber 37, fluid will be drawn back into the system. If the radiator cap 52 of the system should be removed during the time that the system is hot, and hence while there is some liquid in receptacle 47, the liquid will not flow out due to the fact that float-check valve element 50 then floats upwardly and closes the conical valve seat portion 53 against valve seat 54. Fluid of the system is thus not lost even though the radiator cap is open while the system is hot, and when the system subsequently cools the excess fluid stored in tank 47 will be drawn into the system by the vacuum created by the contraction of the fluid.

It is noted that the cooling system in Figure 5 is of the thermosiphon type, there being no auxiliary pump provided.

Figure 7:
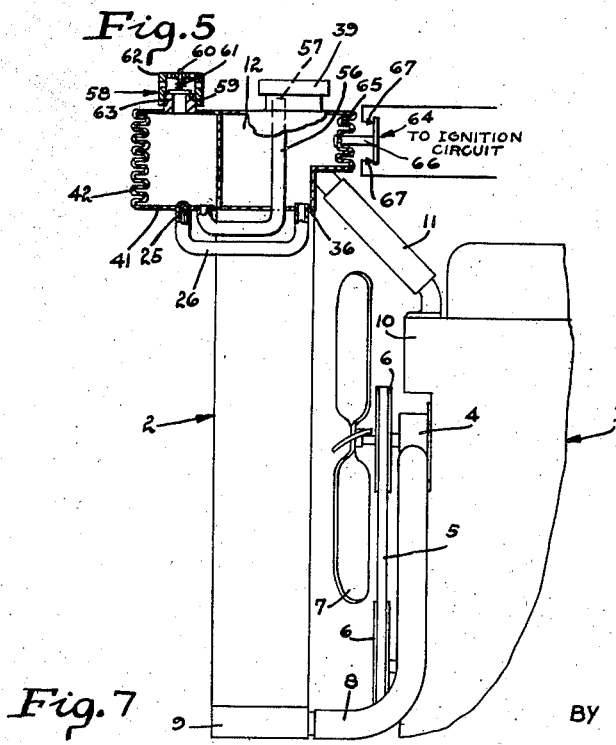
Figure 7 is a sealed engine and cooling system embodying the present invention and various auxiliary devices.

In Figure 7 there is illustrated a sealed cooling system for an internal combustion engine. In this modification the engine which is generally designated as 1 is connected with a radiator section generally designated as 2, by means of tubular connections 11 and 8. Normal circulation of the cooling fluid through the engine and radiator is provided by means of pump 4 which is, as previously explained, driven from the crank shaft by belt 5 and pulleys 6, though a thermosiphon system may be substituted if desired. At the forward side of radiator 2 and adjacent the upper header 12 there is provided a surge tank and condenser section 41 which consists of a completely enclosed receptacle having one wall 42 thereof shaped so as to present a large amount of cooling surface to the atmosphere. It will be noted that this cooling surface is at the foremost part of the system and will thus have an enhanced cooling effect.

The surge and condenser receptacle 41 is provided with a tubular connection 26 to the upper header 12 of the radiator system. This tubular connection 26 connects with a point 36 in the radiator header at which, during the operation of the system the pressure is less than it is during the time the system is not in operation. As previously explained, the pressure at point 36 recedes when the system is operated and fluctuates about an average value.

Tubular connection 26 is provided with a valve 25 such as that shown in Figure 2 and describes in detail in connection with the structures shown in Figures 1 and 2. The surge-condenser chamber 41 is also connected with the radiator system by means of a tubular connection 56 which enters the receptacle 41 at the bottom surface thereof and acts as an overflow 57 for the main radiator system. It is to be noted that tube 57 forms a fluid trap which serves to seal-off the main cooling system from the auxiliary tank 41.

The surge-condenser section 41 is provided with an over-pressure release valve 58 consisting of a valve seat 59 and movable valve element 60 which is normally forced into contact with the valve seat 59 by means of spring 61. The valve is assembled within a cup-shaped cover 62 which is formed with screw threads so as to be fixed to the threaded nipple 63 which forms the outlet port for chamber 41.

In the radiator section 12 of the system shown in Figure 7 there is a pressure-operated switch mechanism generally designated 64 which consists of a flexible diaphragm 65, forming a part of the wall of header 12. The diaphragm carries a movable switch element 66 which cooperates with a pair of stationary contacts 67.

During the normal operation of the system shown in Figure 7 the valve 58 and the switch 64 are closed. The switch 64 is preferably connected in the primary ignition system circuit or may, if desired, serve to operate an auxiliary mechanism which merely slows down the operation of the motor when the switch is opened. During the normal running of the system shown in Figure 7 the motor is cooled by means of radiator section 2 and expansion of the fluid in the radiator due to changes in temperature, or due to surges, will occur as previously explained, with reference to the system shown in Figure 1. As the fluid expands into tank 41 it will compress the air already in that chamber and this compressed air will serve to assist the normal return of the fluid to the radiator system due to collapses of surge and due to variations of pressure at the point 36, which normally serve to free tank 41 of fluid. Since the system is sealed, no vapor will escape but will be condensed by the heat radiated surface 42 and the condensed fluid returned to the system along with the fluid from surges and expansion.

The size of heat radiating surface 42 depends upon the conditions under which the system operates but is normally made sufficiently large that it will dissipate about as much heat as is dissipated by the normal radiator section 2 during normal operation. The heat dissipating section 42 is preferably located so as to be in the free circulation of air, that is to say, in a position in which it will not be affected by any air regulator which might otherwise decrease or regulate the flow of air through radiator section 2. In the normal operation of the system no vapor will be evolved but under extraordinary conditions such as when motor 1 is not operating satisfactorily, or is operating under an excessive load, vapor may be forced through overflow 57 into the tank 41, into contact with surface 42 where it will be condensed and returned to the system. In the event the amount of vapor generated in the motor 1 is in excess of the capacity of condenser section 42, the pressure within the system will rise and operate over-pressure valve 58 and switch 64. The pressure will thus be relieved and as long as the pressure is on the system the ignition circuit will be opened and the engine stopped or a safety device operated in the engine system thereby slowing its operation. The switch 64 is preferably set to operate at a pressure somewhat lower than that at which valve 58 opens, thereby causing the motor 1 to cease or decrease operation before the valve 58 opens.

I claim as my invention:

1. In an engine cooling system of the fluid type in which the maximum fluid level is predetermined by an overflow which passes fluid but restricts the passage of vapors; an improved method of conserving the cooling fluid against loss which comprises, collecting the cooling fluid passed through the overflow, and returning it to a selected region in the system at which, when the engine is operated the average fluid pressure is positive but less than the pressure exerted when the system is not operating.

2. In an engine cooling system of the fluid type in which the maximum fluid level is predetermined by an overflow which passes fluid but restricts the passage of vapors; an improved method of conserving the cooling fluid against loss which comprises, collecting the cooling fluid adjacent the overflow and returning it to a selected region in the system at which, when the engine is operating, the average fluid pressure is positive but less than the pressure exerted when the system is not operating.

3. In an engine cooling system of the type in which the maximum fluid level is predetermined by an overflow which passes fluid but restricts the passage of vapors, and in which the fluid is circulated to and from the engine by flow induced when the engine operates, and in which the average pressure of the fluid at a selected region in the system during engine operation is positive but less than that exerted when the system is not operating; an improved method of conserving the cooling fluid against loss which comprises, collecting the cooling fluid and returning it to the selected region by flow induced in part by the fluid flow in the circulatory system.

4. In an engine cooling system of the type in which the maximum fluid level is predetermined by an overflow which passes fluid but restricts the passage of vapors, and in which the fluid is circulated to and from the engine by flow induced when the engine operates, and in which the average pressure of the fluid at a selected region in the system during engine operation is positive but less than that exerted when the system is not operating; an improved method of conserving the cooling fluid against loss which comprises, collecting the cooling fluid adjacent the overflow, and returning it to the selected region by flow induced in part by the fluid flow in the circulatory system.

5. In an automotive vehicle having a motor cooling system, including a cooling radiator in which the maximum fluid level is predetermined by an overflow which passes fluid but restricts the passage of vapors, and in which the average pressure at a selected region in the motor cooling system remains positive but is less than the pressure exerted when the motor is not operated; an improved method of conserving the cooling fluid against loss which comprises, collecting the cooling fluid, and returning it to said selected region.

6. An engine cooling system of the fluid type, an overflow which passes fluids but restricts the passage of vapors, a reservoir to collect fluid passed through said overflow, and a fluid connection from the reservoir to a selected region in the system at which during the operation of the system the average pressure exerted is positive but less than the pressure exerted when the system is not operating.

7. An engine cooling system of the fluid type having an overflow passageway, a reservoir to collect fluid passed through said overflow, said passageway and reservoir being so formed that a mass of fluid must be moved when fluid moves through said passageway, and a fluid connection from the reservoir to the system, said connection being formed so as normally to contain a mass of fluid which is less than that contained in said passageway.

8. An engine cooling system of the fluid type having an overflow passageway, a reservoir to collect fluid passed through said overflow passageway, said passageway and reservoir being so formed that a mass of fluid must be moved when fluid moves through said passageway from the reservoir to the system, and a fluid connection from the reservoir to the system so formed that a mass of fluid must likewise be moved when fluid passes from the reservoir to the system by way of said connection, the passageway and connection being formed so that the inertia of the mass of fluid moved by movement of fluid through said passageway is greater than the inertia of the mass of fluid moved by movement of fluid through said connection when fluid is drawn into the system by a decrease in pressure therein.

9. An engine cooling system of the fluid type having an overflow passageway, a reservoir to collect fluid passed through said overflow passageway, said passageway and reservoir being so formed that a mass of fluid must be moved when fluid moves through said passageway from the reservoir to the system, and a fluid connection from the reservoir to the system so formed that a mass of fluid must likewise be moved when fluid passes from the reservoir to the system by way of said connection, the passageway and connection being formed so that the inertia of the mass of fluid moved by movement of fluid through said passageway is greater than the inertia of the mass of fluid moved by movement of fluid through said connection when fluid is drawn into the system by valve to restrict the flow of fluid from the system through said connection.

10. An engine cooling system of the fluid type, an overflow which passes fluids but restricts the passage of vapors, a reservoir to collect fluid passed through said overflow; a fluid connection from the reservoir to a selected region in the system at which during the operation of the system the average pressure exerted is positive but less than the pressure exerted when the system is not operating; and a means to prevent the passage of fluid from the system to the reservoir when the positive pressure exceeds the average positive pressure.

11. An engine cooling system of the fluid type having an overflow which passes fluids but restricts the passage of vapors, and a fluid circulating device; a reservoir to collect fluid passed through said overflow; and a fluid connection from said reservoir to a selected point in the system, at which during operation of the system, the average pressure exerted is positive but less than the pressure exerted when the system is not operating.

12. An engine cooling system of the fluid type having an overflow which passes fluids but restricts the passage of vapors, and a fluid circulating device; a reservoir to collect fluid passed through said overflow; a fluid connection from said reservoir to a selected point in the system, at which during operation of the system, the average pressure exerted is positive but less than the pressure exerted when the system is not operating; and a means to prevent the passage of fluid from the system to the reservoir when the positive pressure exceeds the average pressure.

13. An automotive vehicle having an engine and a cooling system therefor, said cooling system including a radiator, an overflow which passes fluids but restricts the passage of vapors; a reservoir connected to said overflow and arranged to collect cooling fluid passed through said overflow, and a connection from the reservoir to a point in the cooling system at which when the engine is operating there is a varying fluid pressure generated, the average of which is positive but less than the pressure at the point when the engine is not in operation.

14. An automotive vehicle having an engine and a cooling system therefor, said cooling system including a radiator, an overflow which passes fluids but restricts the passage of vapors; a reservoir connected to said overflow and arranged to collect cooling fluid passed through said overflow, a connection from the reservoir to a point in the cooling system at which when the engine is operating there is a varying fluid pressure generated, the average of which is positive but less than the pressure at the point when the engine is not in operation, and a means to prevent the passage of fluid from the system to reservoir when the varying pressure exceeds the average pressure.

15. An engine cooling system of the fluid type having an overflow formed with a trap so as to pass fluids but restrict the passage of vapors; a fluid reservoir connected with said overflow, and a fluid passageway from the reservoir to a selected point in the system, the connection and the passageway being arranged so as to be filled with fluid until the reservoir is substantially empty.

16. An engine cooling system of the fluid type having an overflow formed with a trap so as to pass fluids but restrict the passage of vapors; a fluid reservoir connected with said overflow and a fluid passageway from the reservoir to a selected point in the system, the connection and the passageway being arranged so as to communicate with the bottom of the reservoir.

17. An engine cooling system of the fluid type having an overflow formed with a trap so as to pass fluids but restrict the passage of vapors; a fluid reservoir connected with said overflow, a fluid passageway from the reservoir to a selected point in the system, and means to restrict the passage of fluid through the passageway from the system to the reservoir, the connection and the passageway being arranged so as to be filled with fluid until the reservoir is substantially empty.

18. An automobile engine cooling system of the circulatory fluid type, having an overflow which passes fluids but restricts the passage of vapors; a fluid reservoir, a connection from the reservoir to the overflow, and a passageway from the reservoir to a selected point in the system, said connection and passageway being from the bottom of the reservoir.

19. An automobile engine cooling system of the circulatory fluid type, having an overflow which passes fluids but restricts the passage of vapors; a fluid reservoir, a connection from the reservoir to the overflow, a passageway from the reservoir to a selected point in the system, said connection and passageway being from the bottom of the reservoir, and a vapor condenser attached to the reservoir and arranged so as to condense vapors passing through said reservoir to the condenser and so as to return the condensed vapors to the reservoir.

20. A cooling system for an exothermic engine comprising, a heat exchanger; fluid passageways from the heat exchanger to the engine for the circulation of a heat transfer fluid; an overflow for the system, which passes fluids but restricts the passage of vapors; a fluid reservoir; and a connection from the reservoir to the overflow; a fluid passageway from the reservoir to the system; and a normally inactive vapor condenser connected with said reservoir and arranged so as to return condensed vapors to the reservoir, the vapor condenser being of size such that it can dissipate substantially all heat generated by said engine that is not dissipated by the heat exchanger.

21. A cooling system for an exothermic engine comprising a heat exchanger; fluid passageways from the heat exchanger to the engine for the circulation of a heat transfer fluid; an overflow for the system which passes fluids but restricts the passage of vapors; a fluid reservoir and a connection from the reservoir to the overflow; a fluid passageway from the reservoir to the system; a normally inactive vapor condenser connected with said reservoir and arranged so as to return condensed vapors to the reservoir, the vapor condenser being of size such that it can dissipate substantially all heat generated by said engine that is not dissipated by the heat exchanger; and means operable when the pressure in the cooling system reaches a predetermined amount to vent the system.

22. A cooling system for an exothermic engine comprising a heat exchanger; fluid passageways from the heat exchanger to the engine for the circulation of a heat transfer fluid; an overflow for the system which passes fluids but restricts the passage of vapors; a fluid reservoir, and a connection from the reservoir to the overflow; a fluid passageway from the reservoir to the system; a normally inactive vapor condenser connected with said reservoir and arranged so as to return condensed vapors to the reservoir, the vapor condenser being of size such that it can dissipate substantially all heat generated by said engine that is not dissipated by the heat exchanger; and means operable when the pressure in the cooling system reaches a predetermined amount to vent the system.

23. A cooling system for an exothermic engine comprising a heat exchanger; fluid passageways from the heat exchanger to the engine for the circulation of a heat transfer fluid; an overflow for the system, which passes fluids but restricts the passage of vapors; a fluid reservoir, and a connection from the reservoir to the overflow; a fluid passageway from the reservoir to the system; a normally inactive vapor condenser connected with said reservoir and arranged so as to return condensed vapors to the reservoir, the vapor condenser being of size such that it can dissipate substantially all heat generated by said engine that is not dissipated by the heat exchanger; and means operable when the pressure in the cooling system reaches a predetermined amount to halt the operation of the engine.

24. A cooling system for an exothermic engine comprising a heat exchanger; fluid passageways from the heat exchanger to the engine for the circulation of a heat transfer fluid; an overflow for the system, which passes fluids but restricts the passage of vapors; a fluid reservoir, and a connection from the reservoir to the overflow; a fluid passageway from the reservoir to the system; a normally inactive vapor condenser connected with said reservoir and arranged so as to return condensed vapors to the reservoir, the vapor condenser being of size such that it can dissipate substantially all heat generated by said engine that is not dissipated by the heat exchanger; and means operable when the pressure in the cooling system reached a predetermined amount to decrease the rate of operation of the engine.

25. An engine cooling system of the fluid type having a heat dissipating section, a normally closed port for said section; an auxiliary reservoir for the system at least a portion of which is located above the normal fluid level in said section; a tubular connection between the section at the normal fluid level thereof, and said reservoir; and valve means to restrict the flow of fluids from said reservoir to said section when the normally closed port is opened.

26. In an engine cooling system having a radiator, fluid passageways from the engine to the radiator and from the radiator to the engine, an overflow tube from said radiator, a tank, connection means from said tank to the overflow tube and another connection from the tank to the fluid passageway which is from the engine to the radiator.

27. In an engine cooling system having a radiator, fluid passageways from the engine to the radiator and from the radiator to the engine, an overflow tube from said radiator, a tank, connection means from said tank to the overflow tube, another connection from the tank to the fluid passageway which is from the engine to the radiator, and a valve in said latter connection, said valve being positioned so as to check the flow of fluid to said tank.

28. In an engine cooling system having a radiator, fluid passageways from the engine to the radiator and from the radiator to the engine, an overflow tube from said radiator, a tank, connection means from said tank to the overflow tube, another connection from the tank to the fluid passageway which is from the engine to the radiator, and a float check valve in said latter connection, said valve being positioned so as to check the flow of fluid to said tank.

29. An article of manufacture comprising a fluid receptacle, brackets for mounting said receptacle, an overflow pipe communicating with an upper portion of said receptacle, a second pipe connected with a lower portion of the receptacle, and a third pipe including a valve also connected with the bottom of the receptacle.

30. An article of manufacture comprising a fluid receptacle, a vapor condenser attached to said receptacle in fluid communicating relation thereto, means for mounting said receptacle and condenser with the condenser above the receptacle, an overflow pipe connected to the top of the condenser, and two tubular connections to the bottom of the receptacle.

31. An article of manufacture comprising a fluid receptacle, a vapor condenser attached to said receptacle in fluid communicating relation thereto, means for mounting said receptacle and condenser with the condenser above the receptacle, an overflow pipe connected to the top of the condenser, two tubular connections to the bottom of the receptacle, and a check valve in one of the tubes, said valve being oriented so as to restrict the flow of liquid to the reservoir.

32. An article of manufacture comprising a fluid receptacle, brackets for mounting said receptacle, an overflow pipe communicating with an upper portion of said receptacle, a second pipe connected with a lower portion of the receptacle, and a third pipe including a valve also connected with the bottom of the receptacle, said third pipe protruding slightly into the receptacle.

33. An article of manufacture comprising a fluid receptacle, a vapor condenser attached to said receptacle in fluid communicating relation thereto, means for mounting said receptacle and condenser with the condenser above the receptacle, an overflow pipe connected to the top of the condenser, a second pipe connected to the bottom of said receptacle, and a third pipe connected to the bottom of said receptacle and protruding slightly into said receptacle.

EVERETT N. WOOD.